C. T. BOYER.
AUTOMOBILE FUEL TANK.
APPLICATION FILED AUG. 17, 1914.
1,150,332.
Patented Aug. 17, 1915.
2 SHEETS—SHEET 1.
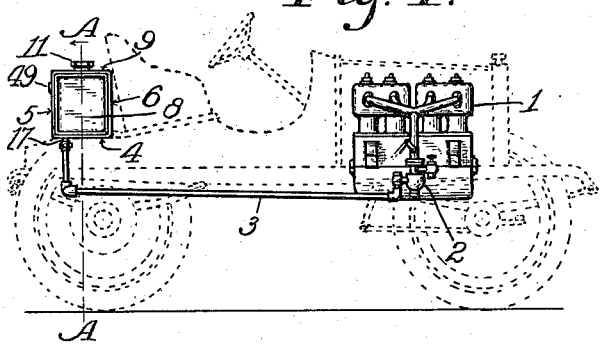
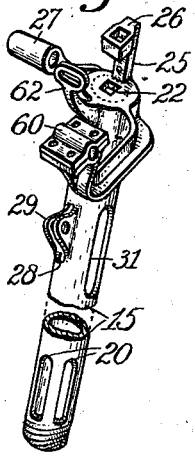
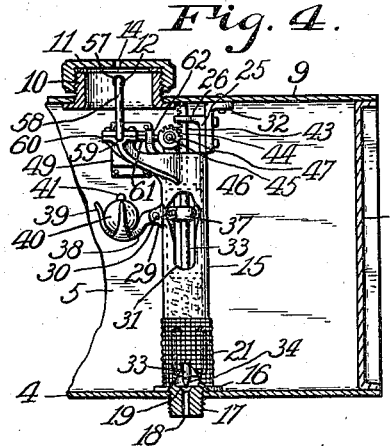
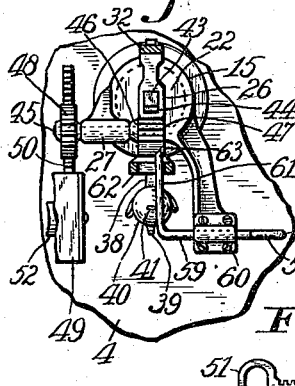
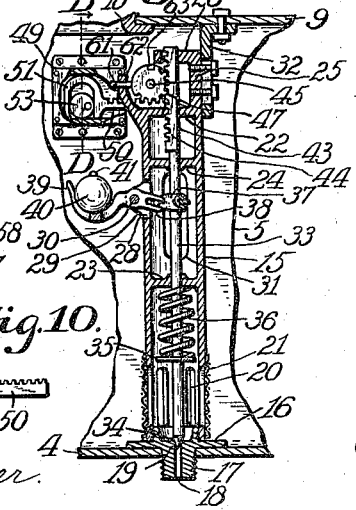
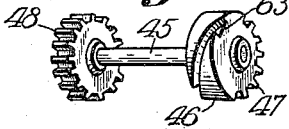
WITNESSES:
J. H. Gardner.
M. E. Sparrow.
INVENTOR:
Charles T. Boyer,
BY
E. T. Silvius,
ATTORNEY.
COLUMBIA PLANOGRAPH CO., WASHINGTON, D. C.

C. T. BOYER.
AUTOMOBILE FUEL TANK.
APPLICATION FILED AUG. 17, 1914.
1,150,332.
Patented Aug. 17, 1915.
2 SHEETS—SHEET 2.
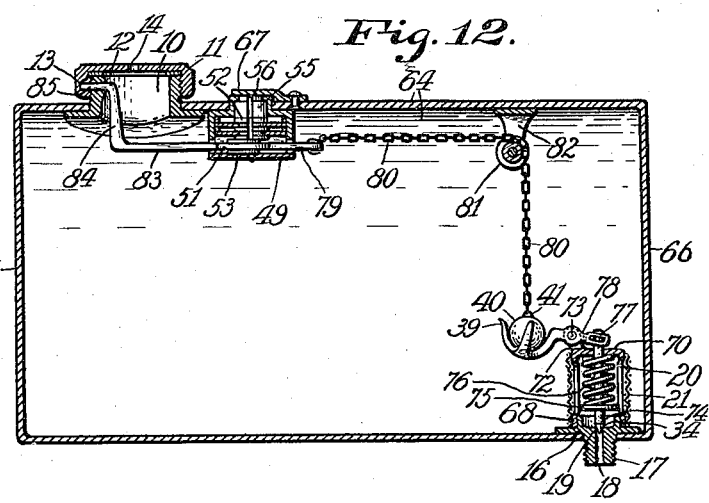
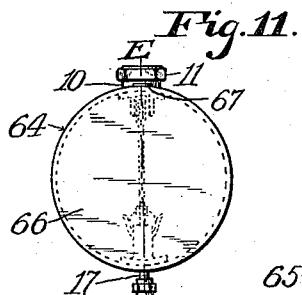
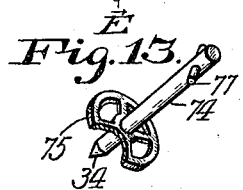
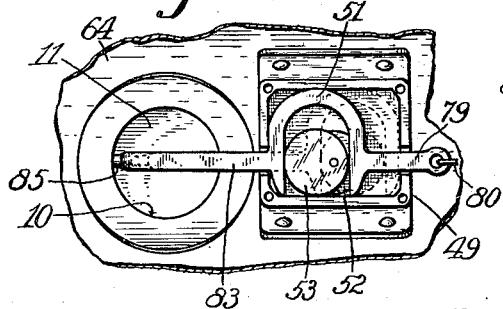
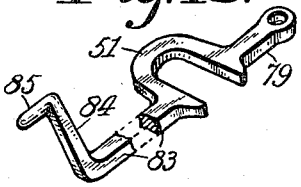
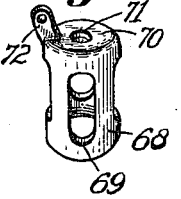
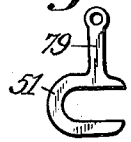
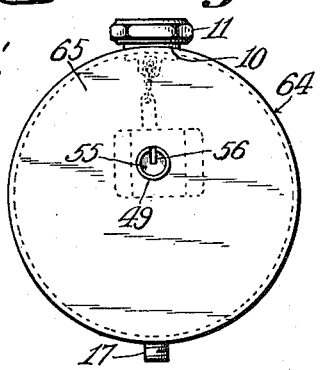
WITNESSES:
J. H. Gardner
M. E. Sparrow
INVENTOR:
Charles T. Boyer,
BY E. T. Silvius,
ATTORNEY.
COLUMBIA PLANOGRAPH CO., WASHINGTON, D. C.

UNITED STATES PATENT OFFICE.

CHARLES T. BOYER, OF INDIANAPOLIS, INDIANA.

AUTOMOBILE FUEL-TANK.

1,150,332.  Specification of Letters Patent.  Patented Aug. 17, 1915.

Application filed August 17, 1914. Serial No. 857,064.

*To all whom it may concern:*

Be it known that I, CHARLES T. BOYER, a citizen of the United States, residing at Indianapolis, in the county of Marion and State of Indiana, have invented a new and useful Automobile Fuel-Tank, of which the following is a specification, reference being had to the accompanying drawings, and to the letters and figures of reference marked thereon.

This invention relates to tanks or reservoirs in which liquids may be stored to be drawn off as may be required, the invention having reference more particularly to a closed tank of such construction as to be adapted to permit the liquid to be drawn off, but preventing the drawing off of the liquid by unauthorized persons, more especially when the tank is made use of for supplying liquid fuel to an automobile engine; and the invention has reference also to a safety automobile fuel tank involving means which, in case the tank is accidentally turned over to abnormal position, shall automatically act to prevent the flow of fuel into the delivery pipe connecting the tank with the engine of the automobile.

An object of the invention is to provide an improved tank or reservoir of such construction as to be adapted to hold or deliver liquid at the will of the owner or authorized user, and prevent unauthorized persons from drawing off the liquid.

Another object is to provide an improved automobile fuel tank with an outlet or stop valve and controlling means therefor which shall permit the fuel to be fed from the tank as required and whereby the flow or feeding of the fuel may be positively prevented excepting through the use of a special or peculiar key, to the end that theft of the automobile or unauthorized use thereof may be prevented by depriving the engine of the automobile of fuel through the usual channel.

A further object is to provide locking means for the inlet or filling opening closure of a fuel tank for the purpose of preventing theft of the fuel through the filling opening.

A still further object is to provide an outlet valve and controlling means therefor, for an automobile fuel tank, which shall automatically act to close the valve in case the automobile is accidentally turned over to a considerable extent from its normal position, for preventing the escape and ignition of the fuel with consequent danger to the occupants of the automobile.

With the above-mentioned and other objects in view, the invention consists in a tank or reservoir of the closed type provided with an internal outlet valve having both automatic and manual control, and having also an inlet or intake aperture and a closure therefor provided with means for locking the closure in closed position after receiving the fuel, the locking means and valve controlling means being inclosed within the tank so as to be inaccessible from the exterior but controllable by means of a key at the exterior of the tank.

The invention consists also further in the novel parts, and in the combinations and arrangements of parts, as hereinafter particularly described and further defined in the accompanying claims.

Referring to the drawings,—Figure 1 is an elevation of an automobile explosion engine and the improved fuel tank of rectangular form connected therewith and arranged as may be convenient in connection with an automobile shown by broken lines; Fig. 2 is a side or normal rear elevation of the improved tank partially broken away to expose internal apparatus thereof; Fig. 3 is a perspective view of a part of the apparatus as preferably constructed; Fig. 4 is a fragmentary sectional elevation on the line A A on Fig. 1; Fig. 5 is a sectional elevation on the line B B on Fig. 2 showing the weight removed from the carrier; Fig. 6 is a fragmentary section and top plan taken beneath the top of the tank; Fig. 7 is a fragmentary section on the line C C on Fig. 5; Fig. 8 is a perspective view of connected elements of the internal apparatus of the tank; Fig. 9 is a fragmentary sectional elevation approximately on the line D D on Fig. 7; Fig. 10 is a side elevation of one form of a part of the lock adapted for the purpose of the invention; Fig. 11 is an end elevation of a cylindrical form of tank or reservoir constructed also in accordance with the invention; Fig. 12 is a sectional view on the line E E on Fig. 11; Fig. 13 is a perspective view of a modified form of outlet valve stem; Fig. 14 is a fragmentary inverted plan view showing a modified form of closure locking means applied as shown more completely in Fig. 12; Fig. 15 is a perspective view of the improved lock bolt for effecting the locking of the outlet valve and the intake closure; Fig. 16 is a perspective view of a modified form of valve cage; Fig. 17 is a side view of a modified form of lock bolt; Fig. 18 is a longitudinal vertical section of a cylindrical type of tank in which the internal apparatus thereof is differently arranged from that shown in Fig. 12; and, Fig. 19 is an end elevation of the preceding figure.

Similar reference characters on the different figures of the drawings indicate corresponding elements or features of construction herein referred to.

In a practical realization of the invention, various forms of tanks or reservoirs may be provided as may be required and the intake and the outlet may be variously arranged with respect to the normal bottom or top or the wall of the tank. As applied to an automobile engine 1, the engine is connected with a suitable intake which usually is supplied through a carbureter 2 to which a supply pipe 3 is connected, and the tank, when of rectangular form, comprises a bottom 4, side walls or plates 5 and 6, relatively small end walls 7 and 8 and a top 9, a convenient portion of the top having a suitable intake or receiving aperture provided with a neck ring or mouthpiece 10 onto which a closure cap 11 is screwed, and for the purpose of the present invention the neck ring is provided with an aperture 12 adapted to receive and guide a locking bolt, the inner side of the cap having a suitable recess into which the bolt may be thrust to prevent unscrewing of the cap, as will be further explained. The tank when not designed for compression-feed is suitably vented, preferably by means of a small vent-hole 14 in the cap.

Preferably a key-controlled lock is employed, and when it is desired to positively hold the outlet valve of the tank in closed position by means of the lock a suitable frame 15 is provided which is preferably of tubular form and adapted to constitute a valve cage and also support the valve-controlling apparatus, and a suitable foot member 16 is suitably secured to the normal lower end of the frame and adapted to and secured to the bottom portion of the tank, the member having a nipple 17 thereon that extends through the bottom portion and has a duct 18 therein at the upper or inner end of which is a valve seat 19, the supply pipe 3 when an engine is to be supplied being connected to the nipple. The valve cage portion of the frame has apertures 20 therein for the passage of the liquid from the tank to the valve seat, the apertures preferably being provided with a valve-protecting screen 21.

The upper portion of the frame 15 is provided with a guide 22 and the frame is provided also with a guiding partition 23 at a suitable distance above the lower end of the frame. The frame has also another guiding partition 24 between the guide 22 and the partition 23.

The upper end of the frame has a standard 25 thereon provided with a guide 26 arranged above the guide 22, the frame having also a journal box 27 thereon.

Between the partitions 23 and 24 the wall of the frame 15 has an aperture 28 and also ears 29 provided with a fulcrum pin 30. Preferably the wall has also a suitable number of openings 31 therein suitably arranged. In order to steady the frame a suitable brace 32 is secured to the upper portion or standard 25 and also to the inner side of the top portion of the tank. A suitable valve stem 33 is provided which is vertically guided in the guiding partitions 23 and 24 and has a valve 34 on its lower end to coöperate with the valve seat 19 and close the duct 18, the stem extending a suitable distance above the partition 24. The stem has a collar 35 fixed thereon so as to be normally on a plane above the apertures 20 and has a coil spring 36 seated thereon which is made of suitable strength and is seated on the under side of the partition 23 whereby to automatically close the valve and hold it on its seat.

In order that the valve may be opened and held open to permit flow of the liquid from the tank, the stem 33 is provided with a suitable controlling collar or device 37 with which is connected a lever 38 that is supported between its ends on the fulcrum pin 30, and the outer portion of the lever has fingers 39 thereon which normally carry a ball or spherical weight 40 adapted to overbalance the spring 36 and lift the valve from its seat, the weight preferably having an eye or ring 41 thereon that may be engaged by a wire rod inserted through the intake opening in order to replace the weight onto the fingers after having been displaced. In some cases, however, a chain 42 is connected to the eye or ring 41 and secured to the upper portion of the tank, preferably to the neck ring 10 whereby to conveniently replace the weight onto the controlling lever of the valve. For the purpose of positively forcing the valve to the seat and locking it in closed position, a valve-controller 43 is provided which preferably is in the form of a rack bar having teeth 44 and slidingly arranged in the guides 22 and 26 so as to have contact with the upper end of the valve stem 33, and obviously may be connected to the stem in order to lift the latter, in case it is not desired to make use of weighting devices and connections for lifting the valve and acting as a safety appliance for permitting the valve to be automatically closed by its spring. In the preferable construction the weighting device causes the valve stem to follow the controller when the latter is elevated to permit the opening of the valve. A shaft 45 is rotatably mounted in the journal box 27 and has a wheel 46 fixed thereon, one portion of the wheel having gear teeth 47 thereon so that a gear segment is provided, the teeth 47 being in engagement with the teeth 44. A toothed wheel or segment 48 is fixed also on the shaft 45 for rotating or holding the shaft. A lock case 49 is secured to the inner side of a suitable portion of the tank and is suitably designed so that a portion of the casing is tightly set into a suitable aperture in the wall of the tank. The locking mechanism may be variously constructed and may comprise a rack bar form of lock bolt 50 suitably guided in the lock case and projecting therefrom into connection with the wheel or segment 48, the lock bolt having an eccentric hook or strap 51 thereon. The lock mechanism may suitably comprise a cylinder 52 rotatably guided in the lock case and to prevent leakage to the exterior of the tank, and may have an eccentric 53 thereon that extends into the eccentric strap, the cylinder being designed to turn forward or backward one-half of a revolution only so as to positively hold the lock bolt in either projected or retracted position, although obviously the lock bolt may be otherwise operated and controlled.

The cylinder 52 has a keyway 54 therein and the lock mechanism is suitably designed so as to require a key that could not readily be duplicated, and preferably the cylinder 52 has a separate and freely rotatable outer end portion 55 having a keyway 56 to make it difficult to turn the cylinder by other means than the proper key. The keyway is accessible from the exterior of the tank and when a key is inserted in the keyway and the cylinder rotated by means of the key in the proper direction, the shaft 45 is rotated so that the controller 43 is elevated and permits the weight to lift the valve 34 from its seat for permitting the feeding of the fuel. When the lock cylinder is turned in the opposite direction the controller is caused to move downward and force the valve to its seat against the opposition of the weight. For the purpose of locking the intake closure, preferably simultaneously with the locking of the outlet valve in closed position, a locking bar 57 is slidingly guided in the aperture 12 formed in the neck ring 10 and is projectable into the recess 13 in the closure cap, and preferably it is carried on an arm 58 which is fixed to a rod 59 that is slidingly mounted in a supporting bearing 60 with which the frame 15 is provided, the rod having a finger 61 thereon that is guided in a guide 62 supported also by the frame 15, the finger extending into a spiral groove or cam 63 formed in a portion of the periphery of the wheel 46, so that a partial rotation of the wheel causes longitudinal movement of the locking bar 57, the arrangement being such that when the valve stem 33 is forced downward the locking bar is projected and locks the cap against removal, thus preventing the removal of the liquid by means of a pump or a siphon through the intake opening.

In some cases a cylindrical form of tank is preferred, or such form as may be other than rectangular, such as a shell 64 and heads 65 and 66, in which case the lock case may be modified so as to be adapted to the curvature of the shell and connected to the upper portion thereof, as illustrated in Fig. 12, in which case a keyhole cover 67 may be provided; however, in some cases the lock may be connected to the head or vertical wall of the tank, as shown in Figs. 18 and 19.

In some cases it may be necessary or desirable to locate the outlet valve and the lock a considerable distance apart, as illustrated in Figs. 12 and 18, so that a connection of considerable length may be required between the valve and the lock, or for other reasons slight modifications may be desired as to the controlling apparatus of the outlet valve, in which case a relatively small frame 68 having apertures 69 therein so as to be adapted for a valve cage is provided and connected to the member 16, the latter being constructed and arranged with respect to the bottom portion of the tank as hereinbefore described. The frame 68 includes a top guide portion 70 having a guideway 71 therein, the top portion being provided also with an ear or fulcrum stand 72 provided with a fulcrum pin 73. A valve stem 74 is guided in the guideway 71 and has the valve 34 on its lower end to coöperate with the valve seat 19, the stem having also a spider or open-work collar 75 fixed thereon which is movably guided in the frame 68 and on which a coil spring 76 is seated, the spring being seated on the under side of the guide portion 70 of the frame through which the valve stem extends. The upper portion of the stem preferably is provided with a pivot pin 77 that is engaged by a lever 78 similar to the lever 38, the lever being connected between its ends to the fulcrum pin 73. The spring automatically acts to close the valve which may be held open by means of the weight 40 placed on the lever. In order to control the weight the lock case 49 has a slidingly-guided plain lock bolt 79 therein provided with the eccentric strap 51 and operated by the eccentric 53 as above described, a chain 80 being connected to the lock bolt and the eye or ring 41 of the weight and extending over a guide sheave 81 supported by a hanger 82 secured to the inner side of the top portion of the tank, as illustrated in Fig. 12, in which case the strap 51 suitably has a rod 83 fixed thereon that is guided in the lock case 49 and has an arm 84 thereon extending laterally in the proper direction to reach into the neck 10, the arm having a lock bolt 85 thereon that is guided in the aperture 12 and projectable into the recess 13, when the lock bolt 71 is moved so as to lift the weight 40 sufficiently to permit the spring 76 to close the outlet valve. In some cases, as illustrated in Fig. 18, the rod 83 is omitted from the strap 51 and a chain 80' is connected to the lock bolt 79 and also with the weight and extends over a guide sheave 81' supported by a hanger 82' secured to the upper portion of the tank, the chain being guided also by a sheave 81'' supported by a hanger 82'' that is secured to the upper portion of the tank above the position of the lock case 49 which is illustrated as being mounted on a vertical portion of the tank, and a sleeve 86 is secured to the chain 80' and has an arm 87 thereon that extends into the neck 10 and carries a lock bolt 88 that is guided in the aperture 12 and projectable into the recess 13, when the chain is pulled by the lock bolt 79 so as to lift the weight 40 and permit the valve to be closed. In some cases a rod 89 is connected to the arm 87, or to the chain, and has a spring 90 connected thereto which is suitably anchored so as to retract the chain and thereby retract the lock bolt 88.

It should be understood that various other modifications than those shown and described may be made in the various details of construction of the tank and the apparatus therein, within the scope of the appended claims. It will be obvious that the lock will be placed as near the top as possible when on a vertical wall and may be adapted to prevent leakage of the liquid therethrough.

It should be understood also that the specific arrangement of the outlet valve described and the relative arrangement of the controlling apparatus therefor may be varied, and therefore the appliances may be arranged and controlled substantially as described for closing any opening communicating between the interior and exterior of the tank.

In practical use the authorized person applies his key to the lock and turns it so as to operate the lock bolt in the proper direction to permit the valve-opening weight to open the valve, the weight being normally carried by the lever that is connected with the valve stem, and when the valve is open it will be understood that the cap 11 is unlocked so that it may be removed, and after having been removed, the lock may be operated to permit the valve to be closed while the tank is being refilled or replenished with fuel. When the automobile is in operation and the fuel fed to the engine by the valve 34, in case of an accident causing the automobile to turn over partially or entirely on its side, the weight 40 must fall by gravity or may be thrown from the fingers 39, so that the valve-controlling lever is released and the valve spring permitted to automatically close the valve and prevent the escape of the fuel through the duct 18. When the automobile is not in use the lock may be quickly operated so as to permit the outlet valve to be closed and simultaneously project the lock bolt for locking the intake closure and thus prevent the automobile from being used, while also preventing the theft of the fuel.

It will be understood that in case the liquid-containing tank is overturned, if it has a vent-hole to prevent formation of vacuum in the tank under normal conditions, the automatically closed outlet valve will prevent entrance of air into the tank and therefore automatically act to prevent liquid from flowing out of the vent-hole when the portion of the tank having the vent-hole is undermost; and, also, in case a cover for an opening in the upper portion of the tank is provided, the cover obviously will prevent flow or leakage of the liquid from the opening when the tank is overturned.

Having thus described the invention, what is claimed as new, is—

1. A fuel tank having an automatically closing outlet valve, and externally-controllable gravity means inclosed in the tank for opening or permitting the closing of the valve.

2. A fuel tank having an internal outlet valve, and externally-controllable means including spring and gravity devices inclosed in the tank for moving and holding the valve in closed or in open position.

3. A fuel tank having an external inlet closure and an internal outlet valve, and lock-controlled means within the tank for locking the closure in closed position and closing and holding the valve in closed position.

4. A fuel tank having an externally removable intake closure adapted to be locked, an externally controllable lock supported within the tank, and locking means movably inclosed within the tank and controlled by the lock for locking the closure in closing position.

5. A fuel tank having an inlet closure provided with a recess, a controllable locking bolt within the tank and projectable into the recess, a lock appliance fixedly secured within the tank and having a key-controlled locking bolt, and a connecting device inclosed in the tank and operatively connected with both of the locking bolts.

6. A fuel tank having an external inlet closure and an internal outlet valve, and externally-controllable locking means inaccessibly inclosed within the tank for simultaneously locking the closure and closing and holding the valve in closed position.

7. A fuel tank having a valve seat therein, a valve to coöperate with the seat, a spring yieldingly holding the valve to the seat, and a weight device removably applied to the valve for lifting and holding the valve from the seat in opposition to the spring.

8. A fuel tank having an outlet valve seat, a valve movably guided to coöperate with the seat, a controllable lock supported by the tank, and means including a shiftable gravity device coöperating with the valve and controlled by the lock for moving the valve to or from the seat.

9. A fuel tank having a valve seat, a valve guided to coöperate with the seat, a spring for yieldingly moving and holding the valve to the seat, and a gravity weight device applied to the valve for overcoming the force of the spring and moving and holding the valve from the seat and provided with a controlling chain.

10. A fuel tank having a valve seat therein, a valve operative to cover the seat, a spring for yieldingly holding the valve to the seat, a weight device applied to the valve for lifting and yieldingly holding the valve from the seat in opposition to the spring, and manually controlled locking means for moving and holding the valve to the seat in opposition to the weight device.

11. A fuel tank having an external inlet closure and an internal outlet valve, externally-controllable locking means inaccessibly inclosed in the tank for simultaneously locking the closure and closing and holding the valve in closed position, and means automatically acting, when the locking means are retracted to unlocking position for opening the valve and when the tank is turned over to abnormal position, to close and hold the valve in closed position.

12. A fuel tank having an opening in the inclosing structure thereof, a valve movably guided for closing the opening and provided with a gravity weight device for moving and holding the valve to open position, the weight device being removable from operative position relative to the valve by the force of gravity on turning of the tank from normal to abnormal position, and a spring operating to automatically close the valve on removal of the weight device from its operative position.

13. A fuel tank including a casing frame having a valve seat therein, a valve stem movably guided in the frame and having a valve to coöperate with the seat, a lever pivoted between its ends to the frame and connected at one end with the valve stem, a weight device carried by the opposite end portion of the lever for opening the valve and provided with means for removing the force of the device from the lever, and a spring coöperating with the frame to automatically close the valve on removal of the force of the weight device.

14. A fuel tank including a cage frame having a valve seat, a valve stem movably guided in the frame and having a valve opposite the seat, a lever fulcrumed between its ends on the frame, one end of the lever being connected with the stem, the opposite end of the lever having a ball-holder, a weighting ball removably retained in the ball-holder for moving and holding the valve from the seat, and a spring coöperating with the frame and the valve stem for automatically moving and holding the valve to the seat on removal of the weight from the weight-holder of the lever.

15. The combination with an explosion engine, a fuel tank having an intake provided with a movable closure, an outlet provided with a movable closure, and a supply pipe connected with the outlet and the engine, of a plurality of movable connecting appliances operatively connected together and controlling the movement of the closures and operating to prevent the opening of both the intake and the outlet, the connecting appliances being inclosed within the tank, and locking mechanism supported in the tank to be accessible exteriorly to the tank and operatively connected with and controlling the plurality of connecting appliances.

16. A receptacle for holding fluids having intake and outlet apertures provided with closures respectively, in combination with a locking appliance supported by the receptacle, and means inclosed within the receptacle and controlled by the locking appliance in coöperation with all the closures, for effectually preventing the opening of both the intake and the outlet apertures.

17. A receptacle for holding fluids having intake and outlet apertures provided with movable means for closing or opening the apertures synchronously controlled to prevent opening of the apertures by locking mechanism and connecting apparatus having operative connection with the locking mechanism.

18. The combination of an explosion engine, a fuel tank for supplying the engine, and movable means inclosed in the tank automatically acting to stop and continue to prevent the supply of fuel to the engine when the engine and the tank are turned over to any abnormal position.

19. In a liquid-container, the combination with a tank having an aperture in the wall thereof, of a neck ring for the aperture connected to the tank and having a guideway in the wall thereof, a closure screwed to the neck ring and having a recess in the wall thereof, a lock bolt movably supported in the tank and projectable or retractable through the guideway and into or out of the recess, and means mounted in the tank operatively connected with the lock bolt for controlling the movement thereof.

20. In a liquid-container, the combination with a normally supported tank having an aperture in the wall thereof provided with a valve seat, of a valve movably guided to coöperate with the seat for closing the aperture and provided with a holding device removably connected operatively with the valve and normally holding the valve in position to open the aperture, the device being affected by the force of gravity and disconnected from the valve when the tank is turned over abnormally in any direction, and means operating on the valve for automatically moving the valve and holding it in closed position when the device is removed from operative connection with the valve.

21. In a liquid-container, the combination of a liquid-holding tank having an outlet aperture, a valve movably guided for closing or opening the aperture and provided with a controlling device, locking mechanism supported by the tank, and a series of appliances movably mounted in the tank and operatively connected with the locking mechanism and the controlling device for effecting the secure holding of the valve in closed position, one of the appliances being withdrawable from operative action on the device for permitting independent movement of the valve to close the aperture, the valve being provided with means within the tank acting automatically when unrestrained to move the valve to close the aperture.

22. In a portable liquid-container, the combination with a tank provided in its normal lower portion with an automatically-closing outlet valve and in its upper portion with an aperture through which fluid may pass, of a holding device removably connected operatively with the valve for normally controlling and holding the valve in open position in opposition to automatic action of the valve, the device being affected by the force of gravity when the tank is overturned to abnormal position and automatically disconnected from control of the valve to permit the automatic action for closing the valve and thereby preventing escape of fluid from the tank through the aperture.

23. In a portable liquid-container, the combination of a tank for normally holding a liquid, an automatically-closing outlet valve mounted in the tank, a lock mounted in the tank and having a key-hole that is open on the exterior of the tank through which fluid may pass, connecting means operatively connected with the lock and the outlet valve for normally holding the valve in open position, and a cover for the key-hole of the lock operable on the exterior of the tank for preventing the passage of fluid into or out of the tank.

In testimony whereof, I affix my signature in presence of two witnesses:

CHARLES T. BOYER.

Witnesses:
E. T. SILVIUS,
M. E. SPARROW.

Copies of this patent may be obtained for five cents each, by addressing the "Commissioner of Patents, Washington, D. C."